United States Patent [19]
Bridwell et al.

[11] 3,879,091
[45] Apr. 22, 1975

[54] PARKING BRAKE CONTROL SYSTEM

[75] Inventors: John W. Bridwell; Norman J. Hodge, both or Peoria, Ill.

[73] Assignee: Caterpillar Tractor Company, Peoria, Ill.

[22] Filed: Jan. 21, 1974

[21] Appl. No.: 435,113

[52] U.S. Cl. .......................... 303/71; 303/9; 303/13
[51] Int. Cl. ............................................. B60t 15/16
[58] Field of Search .............. 303/9, 13, 40, 50, 71; 137/627.5

[56] References Cited
UNITED STATES PATENTS

| | | | |
|---|---|---|---|
| 3,085,833 | 4/1963 | Schultz | 303/29 |
| 3,366,142 | 1/1968 | Bueler | 303/13 |
| 3,746,401 | 7/1973 | Stearns | 303/13 |

Primary Examiner—Duane A. Reger
Attorney, Agent, or Firm—Phillips, Moore, Weissenberger, Lempio & Strabala

[57] ABSTRACT

A control system for a spring-actuated, pressure-released vehicle parking brake. The system includes, in series, a source of fluid under pressure, manually operated actuator valve means, automatic pressure responsive control valve means, and a brake actuator mechanism. The components are intercommunicated by fluid communication means for selectively manually or automatically directing fluid under pressure from said source to and from said brake actuator mechanism for operation thereof. The actuator valve means includes a two position actuator spool which selectively permits or blocks fluid flow from said source to said control valve means. The control valve means includes a spring biased pressure responsive spool member which permits or prevents fluid drainage from the brake actuator for engagement or disengagement thereof.

19 Claims, 1 Drawing Figure

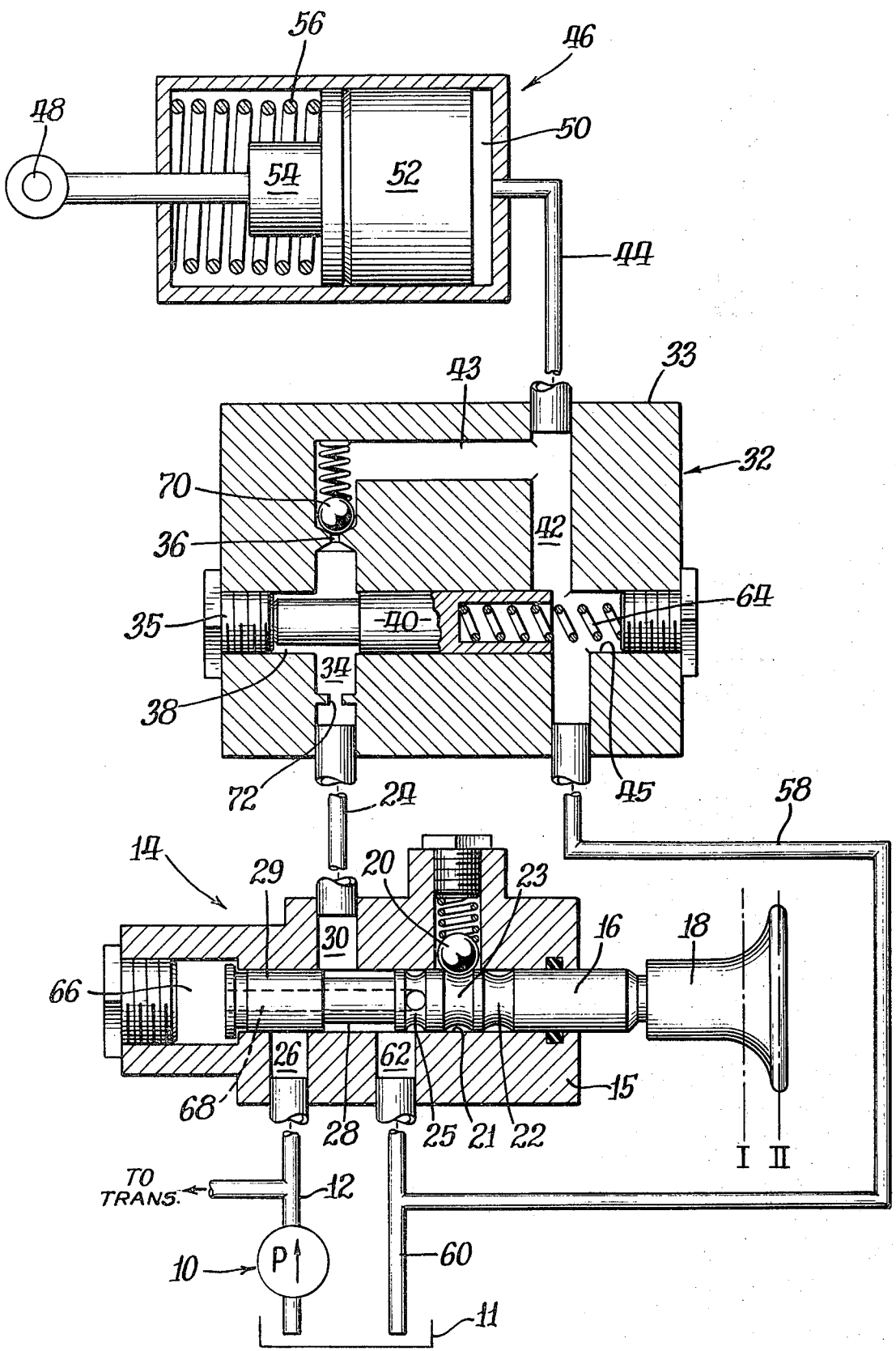

PARKING BRAKE CONTROL SYSTEM

BACKGROUND OF THE INVENTION

This invention relates to a control system for a parking brake in an earthmoving vehicle. In particular, the invention relates to a control means which enables an operator to manually set or release the vehicle parking brake while also providing automatic actuation of the brake in emergency situations.

Most earthmoving vehicles employ safety or parking brake systems which commonly include spring actuated pressure released brake mechanisms. Such systems are usually intended to supplement the primary braking systems to insure vehicle safety in the event of a failure, i.e., a break in a hydraulic line or the like, in the primary system. For example, in the event of such a failure in the primary pressure system, the mechanically actuated brakes would be automatically engaged to halt the vehicle.

It is often desirable in such systems to have the capacity to manually override the automatic braking effect, if desired. For example, when it is desired to shutdown the engine and reduce the fluid pressure in the system to enable towing of the vehicle, it is essential that the parking brake be released. It is also often desirable to insure that the brakes will be applied even when there is no emergency or failure in the hydraulic system of the vehicle. Such an occasion would arise when an operator wishes to leave his machine for a short time without shutting down the engine.

One system which attempts to meet such requirements is disclosed in U.S. patent application, Ser. No. 415,721 entitled "Control Valve for Hydraulic Circuit" filed on Nov. 17, 1973 by Robert DeGeeter and George Schubert, of common assignment herewith. Other related control systems are shown in U.S. Pat. Nos. 3,168,353 to Horowitz, 3,589,484 to Lammers et al., 3,635,317 to Crabb et al., and 3,621,956 to Suckow et al.

In such prior art systems, problems have been caused by their complexity and relative sensitivity to momentary changes in pressure within the vehicle hydraulic system. For example, a line pressure drop, caused by a shifting of the vehicle transmission or similar function, can cause inadvertent application or release of the parking brake in prior art systems even though no emergency situation or sustained pressure condition exists. The instant invention avoids such occurrences.

SUMMARY AND OBJECTS OF THE INVENTION

The instant invention provides an improved control system for a spring actuated pressure disengaged vehicle parking brake. The invention includes manually actuated multi-position valve means for selectively causing the application or disengagement of said brake. The multi-position valve means includes spring detent means for yieldingly retaining said valve means in each of two predetermined operative positions. The system further includes means for automatically moving the multi-position valve means from one to another of said predetermined positions in response to a predetermined low pressure condition in the pressure system of the vehicle.

The main object of the present invention is to provide an uncomplicated and reliable control system for controlling the operation of a pressure released mechanically actuated parking brake in a vehicle wherein the system affords both manual and automatic actuation capabilities.

Other objects and advantages of the present invention will become apparent from the following description and drawing.

BRIEF DESCRIPTION OF THE DRAWING

The sole FIGURE in the drawing is a schematic representation of the present brake control system showing the major components thereof.

DETAILED DESCRIPTION

With reference to the drawing, the instant control system may be seen to include a parking brake actuator mechanism 46. The actuator mechanism includes a chamber 50 within which is disposed a piston 52 which is engaged by and urged rightwardly within the chamber 50 by means of a coil spring 56. The piston has a rod portion 54 which terminates distally in a pin joint 48 which is connectable by linkage to a drive line disposed parking brake assembly (not shown). The actuator is constructed so that the spring 56 mechanically urges the piston 52 rightwardly to engage the brake whenever there is insufficient fluid pressure in the chamber 50 to oppose the spring 56.

The instant system also includes pressure responsive control valve means shown generally at 32. Such control valve means include a body 33 having a plurality of intersecting passages therein. A passage 42 and branch passage 43 are formed within the body and communicate directly with the chamber 50 of the brake actuator by means of a conduit 44. As shown in the drawing, the passage 42 intersects the laterally extending passage 45 in the valve body and continues on to connect by means of a conduit 58 to a relatively low pressure drain point or sump tank 11. The branch passage 43 also intersects a chamber portion 38 of the lateral passage 45. Disposed within the branch passage 43 is a spring actuated one-way ball check valve 70 and a restricted seat portion 36. A passage 34 also intersects the chamber portion 38 and communicates with a conduit 24. The passage 34 is equipped with a restricting orifice 72, the purpose of which will be explained more fully hereinafter.

Disposed within the lateral passage 45 is a pressure actuated spool member 40. The spool member is biased leftwardly into engagement with a plug member 35 by means of a coil spring 64. As shown in the drawing, the spool member has a reduced section portion disposed within the chamber 38 in abutting relation to the plug member 35 and has a spring retaining recess on an opposite end thereof.

Also included in this system are manual actuator valve means shown generally at 14. The actuator means includes a body having an axially disposed bore 21 therein. Intersecting the bore 21 are first, second and third radial bores 26, 30, and 62 respectively. The first radial bore 26 communicates directly with a conduit 12 which conduit communicates respectively with a transmission of the vehicle and with the outlet of the fluid pump means 10 shown disposed to draw fluid from the supply tank 11. The second radial bore communicates with the aforementioned conduit 24 which in turn connects to the passage 34. The third radial bore 62 communicates by means of a conduit 60 with the tank 11.

Slidably disposed within the axial bore 21 is an actuator spool 16 having a hand graspable knob 18 at one end thereof. The actuator spool is provided with two axially spaced grooves 22 and 23, for engaging a spring detent means 20 for selectively engaging any one of said grooves for axially yieldingly retaining the actuator spool 16. The actuator spool also has a reduced section portion 28 between the plural grooves 22, 23, and 25 and a land portion 29. Land portion 29, reduced portion 28, and one of the grooves 25 contain an axial passage 68 which communicates a chamber 66 of the axial bore with the third radial bore 62 and the drain conduit 60. The actuator spool 16 is positionable in two axially spaced settings I and II, corresponding to detent groove positions 22 and 23, respectively.

Operation

With the spool 16 in position II, as shown, the land 29 blocks the first radial bore 26 and prevents the communication of high pressure fluid from the pump 10 to the second radial bore 30, passage 34 and chamber 38. If there is no residual pressure in the chamber 38, then the valve spool 40 will move leftwardly, as shown, under the influence of the coil spring 64. When the spool 40 moves sufficiently leftwardly to open through communication of the passage 42 with the drain conduit 58, the chamber 50 in the brake actuator mechanism will be immediately drained, and the piston 52 will move rightwardly under the influence of the coil spring 56 to engage the vehicle parking brake. If there is residual pressure in the chamber 38, such pressure will drain out relatively slow through the restrictor 72 and bores 30 and 60 to allow the spool 40 to move leftwardly.

If the actuator spool 16 were to be pushed inwardly to position I, the spring detent 20 would engage the groove 22 and the land 29 would move leftwardly within the bore 21 to provide communication between the radial bores 26 and 30 while communication between the radial bores 30 and 62 would be automatically blocked by the portions of the actuator spool immediately adjacent the groove 25. With communication between the radial bores 26 and 30 open, the pump 10 supplies fluid under pressure through the conduit 24 and restricting orifice 72 to the chamber 38. Pressure in chamber 38 would then be sufficient to move the valve spool 40 rightwardly to block communication between the passage 42 and the conduit 58. Concurrently, pressure fluid metering into the chamber 38 would be transmitted through the restricted seat portion 36 for the ball check valve 70 and through the branch passage 43 and conduit 44 to the chamber 50 wherein it would act upon the piston 52 against the bias of spring 56 to disengage the vehicle brake.

It should be noted that with the actuator spool 16 in position I, should a transient pressure drop occur in the system, such as for example one caused by shifting the transmission, the pressure in the chamber 38 would not immediately drop so as to cause the valve spool 40 to move under the influence of the spring 64. This is due to the back flow restricting effect of the restrictor 72 in the passage 34 and to the blockage of the passage 43 from communication with the chamber 38 by means of the ball check valve 70.

As may be readily appreciated by reference to the drawing, with the actuator spool in position I, the brake disengaged position, should an emergency situation arise such as an engine stoppage, pump failure, or rupture in the line 12, the brake will automatically be reset. This is so because when such a sustained pressure reduction occurs, the chamber 38 will be drained or its pressure reduced via the passage 34, conduit 24, radial bore 30 and radial bore 26 to allow the spool 40 to move leftwardly under the influence of the spring 64 to open the chamber 50 to the conduit 58 for drainage thereof with concomitant engagement of the brake. As previously explained, transient or momentary loss of pressure will not appreciably effect the position of the spool 40.

The tank 11 will usually be maintained at a relatively low supply pressure. Upon the occurrence of one of the above-mentioned emergency situations, back pressure caused by flow to tank 11 will be communicated to the chamber 66 via the passage 68 and such pressure in the chamber 66 will normally be suficient to overcome the bias on the detent 20 to allow the actuator spool 16 to automatically shift from the brake disengaged position I to position II, for re-engagement of the brake. The actuator spool 16 will remain in this brake engaged position until such time as the operator manually shifts it back to position I in a controlled manner.

While the invention has been described with particular reference to the preferred embodiments, it is apparent that variations and modifications are possible within the purview of the inventive concepts. No limitation with respect to such variations and modifications is intended, except by the scope of the appended claims.

What is claimed is:

1. A fluid control system for controlling flow of pressure fluid from a source of fluid under pressure to an automatically actuated pressure released brake including; actuator valve means, first fluid communication means for communicating said source with said actuator valve means, control valve means, second fluid communication means for communicating said control valve means with said actuator valve means, third fluid communication means for communicating said control valve means with said brake for actuation thereof, said actuator valve means including bore means and including actuator means disposed in a portion of said bore means for selectively communicating portions of said first and second fluid communication means to selectively communicate pressure fluid from said source to said control valve means, said control valve means including passage means and spool means disposed within a portion of said passage means for selectively communicating portions of said second and third fluid communication means for communicating fluid to and from said pressure released brake for respective disengagement and engagement thereof, check valve means disposed within said passage means between said second fluid communication means and said third fluid communication means for permitting fluid flow past said check valve means only from said second to said third fluid communication means.

2. The invention of claim 1 wherein said bore means include an axial bore within which is disposed said actuator means.

3. The invention of claim 2 wherein said bore means further include a first radial bore directly communicated with said axial bore, said first fluid communication means including a first conduit communicating said source with said first radial bore.

4. The invention of claim 3 wherein said bore means further include a second radial bore communicating with said axial bore, said second fluid communication means including a second conduit communicating said control valve means with said second radial bore.

5. A fluid control system for controlling flow of pressure fluid from a source of fluid under pressure to an automatically actuated pressure released brake including; actuator valve means, first fluid communication means for communicating said source with said actuator valve means, control valve means, second fluid communication means for communicating said control valve means with said actuator valve means, third fluid communication means for communicating said control valve means with said brake for actuation thereof, said actuator valve means including bore means and including actuator means disposed in a portion of said bore means for selectively communicating portions of said first and second fluid communication means to selectively communicate pressure fluid from said source to said control valve means, said control valve means including passage means and spool means disposed within a portion of said passage means for selectively communicating portions of said second and third fluid communication means for communicating fluid to and from said pressure released brake for respective disengagement and engagement thereof, said bore means including an axial bore within which is disposed said actuator means, said bore means further including a first radial bore directly communicated with said axial bore, said first fluid communication means including a first conduit communicating said source with said first radial bore, said bore means further including a second radial bore communicating with said axial bore, said second fluid communication means including a second conduit communicating said control valve means with said second radial bore, said actuator means including a land portion and said actuator means being axially shiftable to a first predetermined position wherein said land portion permits fluid communication between said first and second radial bores through said axial bore and said actuator means being axially shiftable to a second predetermined position wherein said land portion blocks fluid communication between said first radial bore and said axial bore while concurrently permitting fluid communication between said second radial bore and said axial bore.

6. The invention of claim 5 wherein said bore means further include a third radial bore in fluid communication with said axial bore.

7. The invention of claim 6 wherein said actuator valve means include spring detent means, said actuator means further including first and second axially spaced grooves corresponding respectively to said first and second axial positions of said actuator means for engaging said detent means and for yieldingly retaining said actuator means in each of said axial positions.

8. The invention of claim 7 wherein said axial bore further includes a chamber disposed at one axial end thereof within which chamber is disposed at a first axial end portion of said actuator means, said actuator means further including a third axial spaced groove and communicating said chamber with said third axially spaced groove, said third axially spaced groove being in fluid communication with said third radial bore when said actuator means is disposed in said second predetermined axial position.

9. The invention of claim 8 wherein said first fluid communication means include a third conduit communicating said source with said third radial bore.

10. The invention of claim 8 wherein said actuator means further include a hand manipulable knob on a second axial end portion of said actuator means.

11. The invention of claim 1 wherein said source includes fluid pump means and a low pressure fluid supply tank.

12. The invention of claim 6 wherein said passage means include a lateral passage within which is disposed said spool means, said passage means further including a first passage in constant fluid communication with said lateral passage, said first passage being communicated with said second radial bore by said second conduit.

13. The invention of claim 12 wherein said passage means further include a second passage in fluid communication with said lateral passage and in fluid communication by means of a fourth conduit with said brake.

14. The invention of claim 13 wherein said passage means further include a branch passage communicating concurrently with said lateral passage, said first passage and said second passage.

15. The invention of claim 14 wherein said second passage communicates with said source by means of a fifth conduit, and wherein said spool means is shiftable to a first axial position wherein said spool means blocks fluid communication between said second passage and said fifth conduit.

16. The invention of claim 15 wherein said spool means is shiftable to a second axial position wherein it permits fluid communication from said second passage to said fifth conduit, said spool means including a spring for biasing said spool means toward said second position.

17. The invention of claim 16 wherein said control valve means further include restriction means disposed with said first passage for retarding the rate of fluid flow between said first passage and said lateral passage.

18. The invention of claim 17 wherein said control valve means further include one-way check valve means in said branch passage for permitting fluid flow from said lateral passage to said branch passage while preventing fluid flow from said branch passage to said lateral passage.

19. The invention of claim 18 wherein said lateral passage includes a chamber within which is disposed an end portion of said spool means, said spool means being axially shiftable to said first position by exertion of fluid pressure upon said end portion of said spool means when said actuator means is shifted to said first predetermined axial position.

* * * * *

UNITED STATES PATENT OFFICE
CERTIFICATE OF CORRECTION

PATENT NO. : 3,879,091
DATED : April 22, 1975
INVENTOR(S) : John W. Bridwell, et al It is certified that error appears in the above-identified patent and that said Letters Patent are hereby corrected as shown below:

On the Title Page, Item [73], change the spelling of the assignee's corporate name from "Caterpillar Tractor Company" to --- Caterpillar Tractor Co. ---.

Signed and Sealed this twenty-third Day of September 1975

[SEAL]

Attest:

RUTH C. MASON
Attesting Officer

C. MARSHALL DANN
Commissioner of Patents and Trademarks